United States Patent
Nyzen et al.

(10) Patent No.: US 10,603,609 B2
(45) Date of Patent: Mar. 31, 2020

(54) FILTER FOR THE CAPTURE AND RETENTION OF LARGE DEBRIS

(71) Applicant: EATON CORPORATION, Cleveland, OH (US)

(72) Inventors: Robert J. Nyzen, Hiram, OH (US); Martin A. Clements, North Royalton, OH (US); Samuel E. Maxwell, Twinsburg, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/310,906

(22) PCT Filed: Jul. 15, 2015

(86) PCT No.: PCT/US2015/040480
§ 371 (c)(1),
(2) Date: Nov. 14, 2016

(87) PCT Pub. No.: WO2015/176078
PCT Pub. Date: Nov. 19, 2015

(65) Prior Publication Data
US 2017/0087485 A1 Mar. 30, 2017

Related U.S. Application Data

(60) Provisional application No. 61/993,690, filed on May 15, 2014.

(51) Int. Cl.
*B01D 29/23* (2006.01)
*B01D 35/30* (2006.01)
*B01D 29/90* (2006.01)

(52) U.S. Cl.
CPC .......... *B01D 29/23* (2013.01); *B01D 29/902* (2013.01); *B01D 35/30* (2013.01)

(58) Field of Classification Search
CPC ....... B01D 29/23; B01D 35/30; B01D 29/902
USPC ........ 210/448, 457, 435, 437, 247, 320, 499
See application file for complete search history.

(56) References Cited

U.S. PATENT DOCUMENTS

| | | | |
|---|---|---|---|
| 3,912,638 A | 10/1975 | Beaubien | |
| 4,476,021 A * | 10/1984 | Souza | B01D 35/02 210/248 |
| 2002/0195383 A1 | 12/2002 | Caiozza | |
| 2003/0038090 A1 | 2/2003 | Gershenson | |
| 2005/0082212 A1 * | 4/2005 | Wade | B01D 29/23 210/170.03 |

(Continued)

OTHER PUBLICATIONS

PCT/US2015/040480, International Search Report and Written Opinion. dated Oct. 20, 2015.

*Primary Examiner* — Madeline Gonzalez
(74) *Attorney, Agent, or Firm* — Fay Sharpe LLP

(57) ABSTRACT

A filter for a fluid system is designed to capture and retain large debris. The filter includes a structure that captures the debris, and due to the design, configuration, or conformation of the structure, the structure makes it difficult for the captured debris to break loose and thereby prevents repeated impact of the debris with a filter surface. Different embodiments form regions of reduced turbulence such as an angled annular wall, angled wall, or baffles, or a contoured basket in an inlet region that captures large debris, and retains the debris in the structure of the filter.

16 Claims, 2 Drawing Sheets

(56) References Cited

U.S. PATENT DOCUMENTS

2009/0020465 A1    1/2009   Jiang et al.
2010/0270242 A1   10/2010   Paradise

\* cited by examiner

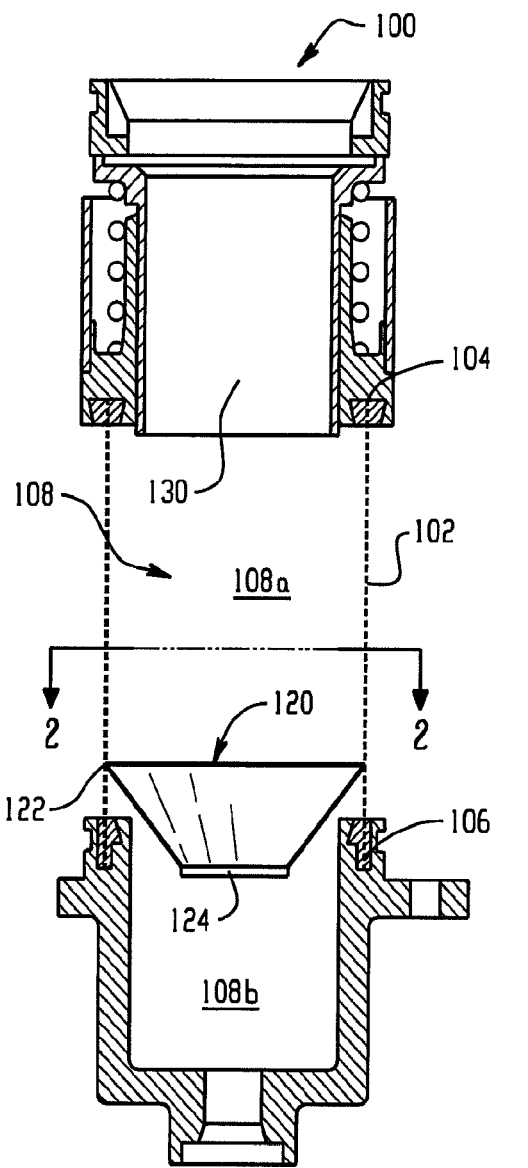
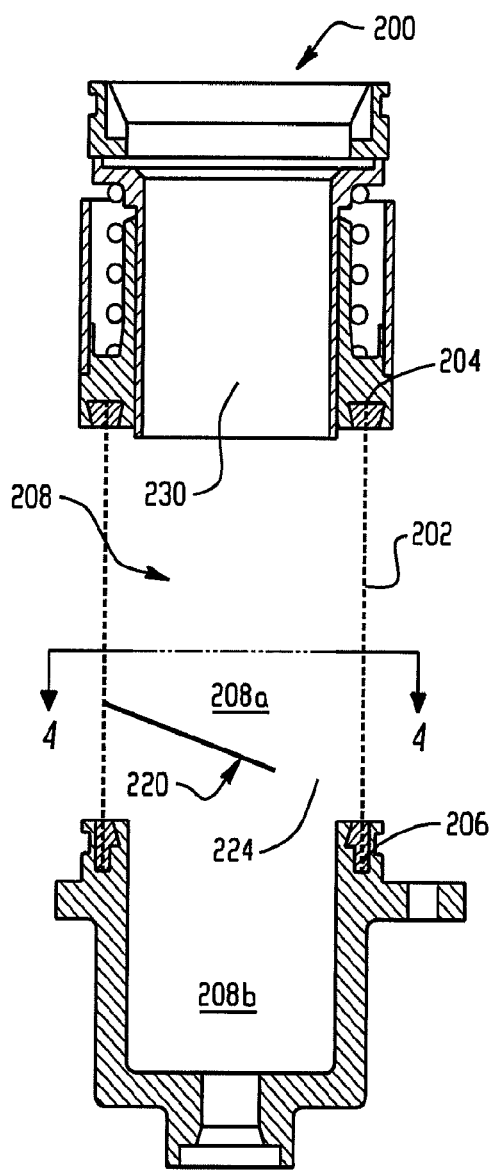
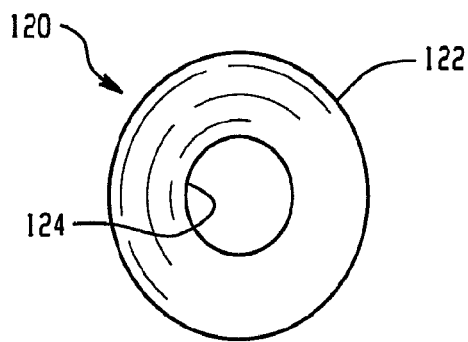
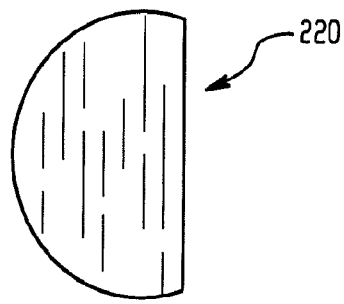
Fig. 1
Fig. 2
Fig. 3
Fig. 4

FILTER FOR THE CAPTURE AND RETENTION OF LARGE DEBRIS

This application claims the priority benefit of U.S. provisional application Ser. No. 61/993,690, filed May 15, 2014, the disclosure of which is expressly incorporated herein by reference.

BACKGROUND

The present disclosure relates to an apparatus, filter, or strainer (hereinafter referred to as a filter). The disclosure finds particular application as a filter for fluid flow, such as filtering fuel in a fuel pump environment, and is directed to entrapping or retaining large debris that enters the filter to minimize the potential for damage to the filter and/or downstream of the filter. It may find application in related environments and applications that encounter similar conditions.

Many main fuel pumps contain a filter to protect the high pressure stage, typically referred to as an interstage strainer. The purpose of the filter is to collect and retain large debris. Often the filtration level is fairly course as the main fuel filter in the system is designed to collect small particulates. The design of these filters is usually a large cylindrical screen with significant internal volume to hold large debris, e.g., a bolt, a nut, a washer, etc. When a large item is introduced into the filter, the flow velocity, engine vibration, and pump vibration cause the item to move within the filter and potentially could eventually wear through as result of repeated impact with the filter surface.

Consequently, a need exists for an improved filter that captures and immobilizes the debris, thus preventing motion that could potentially lead to wear through of the filter screen.

SUMMARY OF THE DISCLOSURE

There is provided a filter for a fluid system that is designed to capture and retain large debris.

The filter includes a structure that captures the debris, and due to the design, configuration, or conformation of the structure, the structure makes it difficult for the captured debris to break loose and thereby prevents repeated impact of the debris with a filter surface.

A primary advantage of the present disclosure is the ability to not only capture but retain debris and thereby subsequently limit movement of the debris.

Another benefit resides in the ability to tune the structure.

Still another advantage is found in accommodating the improved filter in the same footprint of existing filters.

Additional benefits and advantages of the present disclosure will become more apparent from reading and understanding the following detailed description.

BRIEF DESCRIPTION OF THE DRAWINGS

FIG. 1 is a longitudinal cross-sectional view of a first embodiment of the present disclosure.

FIG. 2 is a view taken generally along the lines 2-2 of FIG. 1.

FIG. 3 is a longitudinal cross-sectional view of a second embodiment of the present disclosure.

FIG. 4 is a view taken generally along the lines 4-4 of FIG. 3.

DETAILED DESCRIPTION

Figures 5, 6:
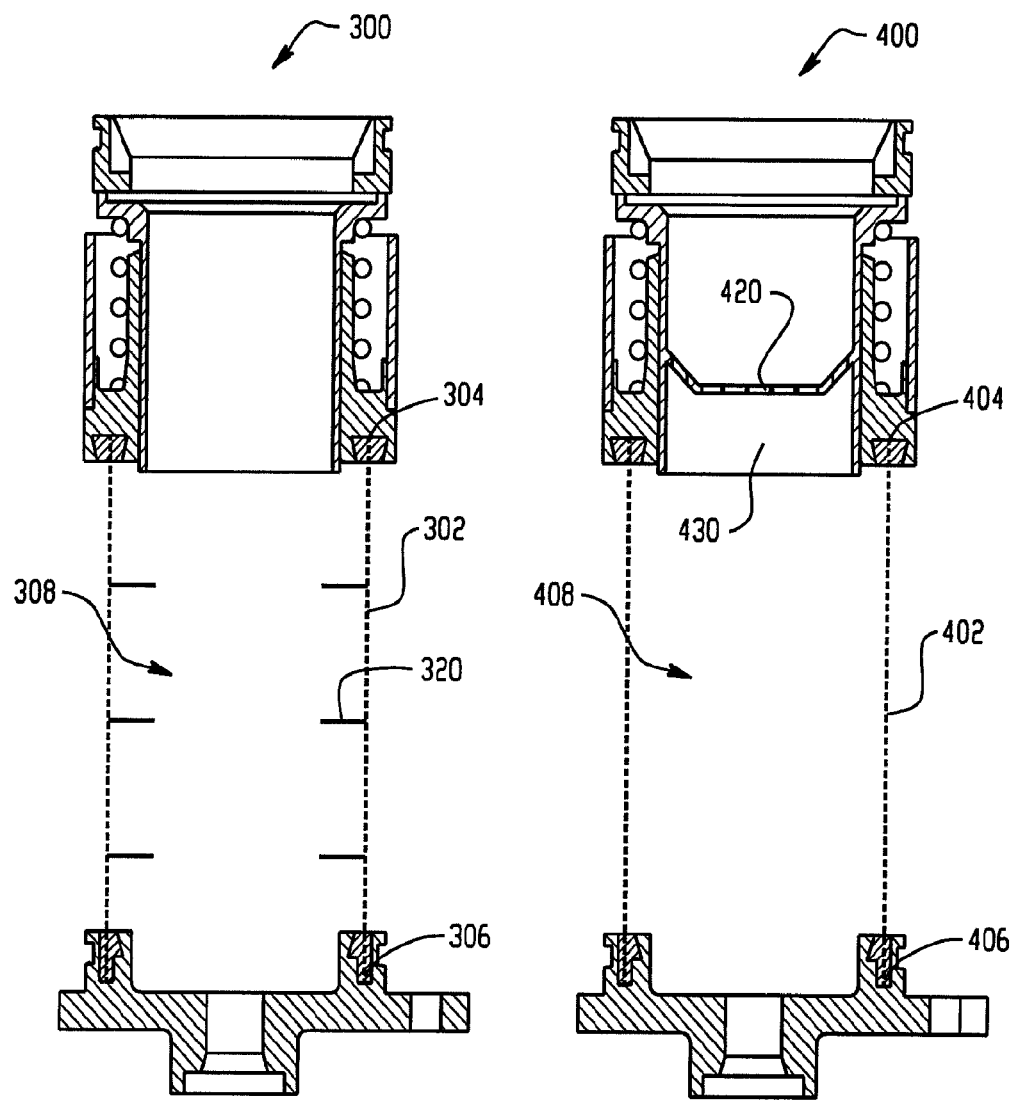
FIG. 5 is a longitudinal cross-sectional view of a third embodiment of the present disclosure.
FIG. 6 is a longitudinal cross-sectional view of a fourth embodiment of the present disclosure.

The use of interstage filters or strainers is common in aircraft engine fuel systems as a last chance filter upstream of a positive displacement high-pressure pump stage and that protects the pump stage from large debris. These filters are typically a high micron rated screen or mesh formed in a cylindrical shape with significant internal volume to capture large debris such as bolts, washers, etc. Fluid flow typically enters through one end of the cylinder and exits in a generally radial direction through the screen. When an item enters the filter, the item will continue to move due to flow stream currents and vibration due to the engine and pump. This motion could cause the item to repeatedly impact the screen causing wear and permanent damage. Eventually, this wear could lead to potential failure of the screen. Although it has been proposed to make the screen more durable, e.g., thicker, it is believed that such a solution would only extend the time for wear to occur.

The present disclosure proposes to resolve the problem of large debris in connection with a filter of this type by preventing the debris or item from moving once the debris has entered the filter. One design as shown in FIGS. 1 and 2 employs a design intended to isolate large debris from a highly motivating turbulent flow field so that the large debris becomes immobile. More specifically, a filter 100 is typically used to capture large debris (not shown). A hollow housing or screen 102 is shown as a generally hollow cylindrical screen that is open at first and second ends 104, 106, and forms a significant internal volume or internal cavity 108 to hold large debris. The housing 102 has openings 110 that extend radially therethrough to provide a high micron rate cylindrical screen or mesh. The openings 110 are of a predetermined size and typically uniformly spaced along the housing 102.

A generally annular, partially conical or frusto-conical wall 120 is positioned in the internal volume 108, preferably nearer the outlet end 106 and spaced from the inlet end 104. The precise location of the wall 120 may vary, but the wall is intended to separate the internal volume 108 into first and second portions 108a, 108b shown upstream and downstream of the wall 120. Preferably the wall 120 is secured about an outer periphery or outer circumference 122 to an inner surface of the screen 102. Any conventional manner of securing the wall 120 and screen 102 may be used. A through opening 124 is provided in the wall 120 located at a generally central location in this arrangement and the through opening is also axially spaced downstream from the outer circumference 122 and thereby the wall is generally configured as a symmetrical, generally frusto-conical shape, although one skilled in the art will recognize that other shapes or conformations may be used without departing from the scope and intent of the present disclosure. For instance, the opening 124 need not be centered in the wall 120, and the opening need not be located downstream of the remainder of the wall.

The internal volume/cavity first portion 108a receives flow directly from inlet end or inlet passage 130. The flow at the inlet end 130 generally proceeds axially into the cavity 108 and then exits radially through the screen 102, the flow is generally turbulent and thus creates the issues associated with large debris as described above. In an effort to limit the impact of the flow on large debris that enters the cavity 108, the wall 120 creates a cavity portion 108b downstream of the wall (and likewise downstream of the cavity first portion 108a) that has a reduced level of turbulence. In this manner, past experience with large debris (not shown) helps to determine a suitable dimension of the opening 124 to receive the potential large debris therethrough and allow the debris to become entrapped/retained/isolated in the cavity portion 108b. The orientation of the opening 124 downstream of the outer periphery of the wall 120 also aids in directing the debris through the opening, and creates a cavity portion 108b of reduced turbulence that reduces the possibility that the debris, once the debris has entered into the cavity portion 108b, is able to re-enter the cavity portion 108a.

FIGS. 3 and 4 use many of the same design principles in filter 200 that receives flow from the inlet end 230 and cavity portion 208a, and subsequently prevents or limits the movement of the debris once the debris has entered into cavity portion 208b. Here, wall 220 creates first and second cavity portions 208a, 208b and the wall has a different conformation than that shown and described in connection with FIGS. 1 and 2. Specifically, the wall 220 has the general shape of a truncated circle, i.e., the substantially circular shape is cut off along a chord, that forms an opening 224 that is offset from the central portion of the cavity and instead is positioned along one edge region of the inner periphery of the screen 202 (to the right-hand side as illustrated in FIG. 3). Likewise, the wall 220 is inclined or disposed at an angle relative to the longitudinal axis of the housing 202 so that a connection region of the wall along an outer peripheral portion thereof with the screen is upstream of the opening 224. Again, this angular positioning of the wall 220 aids in directing the debris through the opening 224, and creates a cavity portion 208b of reduced turbulence that reduces the possibility that the debris, once the debris has entered into the cavity portion 208b, is able to re-enter the cavity portion 208a.

Another embodiment is shown in FIG. 5. Particularly, filter 300 uses baffles 320 that extend or project inwardly from an inner surface of the screen or housing 302 to reduce the motivating turbulent flow field by the incorporation of the baffle plates in the screen body 302. In FIG. 5, the baffles 320 extend radially inward from an inner surface of the screen 302, and more particularly in this arrangement, the baffles extend substantially perpendicular to the inner surface of the screen. Moreover, the baffles 320 are circumferentially continuous or discontinuous and each extend radially inward into the cavity 308 approximately the same dimension, and are equally spaced in an axial direction (i.e., in an axial direction defined between the inlet end 304 and the outlet end 306), although it is also contemplated that the baffles can be oriented at a non-perpendicular angle, may extend inwardly into the cavity by different dimensions, and may have variable axial spacing as desired for a particular set of flow parameters. The baffles 320 create regions of decreased turbulence in the regions of the baffles so that debris entering into the lower turbulent regions will have a tendency to remain in such regions.

FIG. 6 illustrates yet another design in which a basket 420 is disposed in the inlet region 404 of the filter 400. The flow in the inlet region 404 is generally uniform (i.e., not turbulent or at least less turbulent than the flow in the cavity 408 where the fluid transitions between axial to radial flow, and even recirculates through the openings 410 in the screen 402). Preferably the basket 420 has a contoured shape that does not adversely impact the generally laminar flow in this region. As a result, large debris captured in the basket 420 does not have the same tendency to repeatedly bounce against the inner surface of the basket and cause undesired wear as the debris might encounter when captured in a turbulent flow region.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A filter comprising:
   a housing having a housing inlet and a housing outlet;
   an elongated hollow screen formed in a cylindrical shape as a part of the housing between the housing inlet and the housing outlet that defines an internal cavity formed between an inlet end and an outlet end of the screen, flow entering the screen from the inlet end and passing radially outward through the screen as filtered flow at a location between the inlet end and the outlet end of the screen; and
   a wall received within the internal cavity of the screen having an outer perimeter portion secured to the screen and a second portion that extends radially inward into and terminates in the internal cavity without extending across an entire cross-sectional area of the hollow screen for capturing or retention of debris entering the cavity, the wall including one of an annular wall, angled wall, or baffle to create a cavity first portion of less turbulence downstream of the wall.

2. The filter of claim 1 wherein the hollow screen is a mesh sidewall through which filtered flow may proceed from the internal cavity.

3. The filter of claim 2 wherein the wall has a central opening.

4. The filter of claim 3 wherein the central opening is disposed downstream of the outer perimeter portion.

5. The filter of claim 2 wherein the wall is an angled wall extending from the outer perimeter portion secured to the mesh sidewall and an inner portion, terminal edge terminating in the internal cavity.

6. The filter of claim 5 wherein the terminal edge of the angled wall is located downstream of the outer perimeter portion.

7. The filter of claim 2 wherein the wall is a baffle extending radially inward into the internal cavity from the mesh sidewall.

8. The filter of claim 7 wherein the wall includes multiple baffles that are located at axially spaced locations in the internal cavity of the housing wherein the multiple baffles are located closer to the inlet end than the outlet end.

9. The filter of claim 8 wherein the multiple baffles are equi-spaced along a longitudinal extent of the internal volume of the housing.

10. The filter of claim 1 wherein the wall separates the internal cavity inside the screen into a first portion upstream of the wall and a second portion downstream of the wall, and an opening formed by the wall that communicates between the first portion and second portion of the internal cavity is spaced from the outer perimeter end of the wall to reduce the possibility that debris that passes through the opening and enters the second portion of the internal cavity is able to re-enter the first portion of the internal cavity.

11. The filter of claim 1 wherein the wall has a central opening.

12. The filter of claim 11 wherein the central opening is disposed downstream of the outer perimeter portion.

13. The filter of claim 1 wherein the wall is angled and extends from the outer perimeter portion that is secured to the screen, and an inner portion, terminal edge terminating in the internal cavity at a location closer to the housing outlet than the outer perimeter portion.

14. A method of retaining debris in a filter housing comprising:
providing a housing having a housing inlet and a housing outlet;
providing a cylindrical filter in the housing between the housing inlet and outlet, the filter having a screen with an internal cavity formed between an inlet end and an outlet end of the screen;
providing a wall within the internal cavity of the screen; and
joining an outer perimeter portion of the wall to an inner surface of the cylindrical screen and a second end terminating within the internal cavity without extending across an entire cross-sectional area of the screen at a location spaced from the screen to create a cavity first portion of less turbulence downstream of the wall that captures or retains debris in the internal cavity; where the wall is at least one of an annular wall, angled wall, or baffle to create regions downstream of the wall of less turbulence and thereby reduce the possibility of debris re-entering upstream of the wall.

15. The method of claim 14 further including securing a perimeter portion of an angled wall to the screen and locating a terminal edge of the wall downstream of the perimeter portion.

16. The method of claim 14 including extending a baffle radially inward into the internal cavity from the screen.

* * * * *